_United States Patent_ [19]

Mosing

[11] 4,429,719

[45] Feb. 7, 1984

[54] PIPE THREAD PROTECTOR

[76] Inventor: Donald E. Mosing, P.O. Box 53909, Lafayette, La. 70505

[21] Appl. No.: 405,595

[22] Filed: Aug. 5, 1982

[51] Int. Cl.³ .................... B65D 59/06; F16L 21/02
[52] U.S. Cl. ................................ 138/96 T; 138/89; 29/33 T
[58] Field of Search ............... 138/89, 96 R, 96 T, 138/109; 137/199, 519; 29/506, 507, 508, 522 R, 523, 525, 33 T, 236, 237; 220/202, 208, 209, 231, 281, 316, 329, 360, 361, 367, 373

[56] References Cited

U.S. PATENT DOCUMENTS

| | | | |
|---|---|---|---|
| 2,143,480 | 1/1939 | Gundermon | 138/96 T |
| 2,378,710 | 6/1945 | Krause | 138/96 T |
| 3,485,271 | 12/1969 | Halsey | 138/96 T |
| 3,586,031 | 6/1971 | Muller et al. | 138/89 X |
| 4,020,873 | 5/1977 | Palarino | 138/96 T |
| 4,205,707 | 6/1980 | Lyndgren | 138/96 T X |
| 4,269,232 | 5/1981 | Witschi | 138/89 X |

_Primary Examiner_—James E. Bryant, III
_Attorney, Agent, or Firm_—Guy E. Matthews

[57] ABSTRACT

A pipe thread protector is provided which includes two members, one slidably constrained within the other. The interior member has a guide section which includes internal ridges adapted to engage the threads of a pipe section. When placed in one position within the outer member, this upper section is expanded to allow insertion over the end of a pipe. The resistance of the pipe section pushes the interior member further into the second member to assume a second position whereby the guide section is radially contracted. This places the ridges in sealing engagement with the threads of the pipe. Simultaneously, air is forced out from between the interior and exterior members through a valve in the base of the outer member so that a partial vacuum is formed between the inner and outer members. Surrounding air pressure secures the interior member in its second position and the pipe thread protector mounted on the pipe. When it is desired to remove the pipe thread protector, the valve is manually opened, equalizing inside and outside forces on the protector, enabling extraction of the protector from the pipe member without resistance.

Alternatively, mechanical structure may be devised for maintaining the pipe thread protector in engagement with the pipe threads. Further, the pipe thread protector may be adapted to engage and protect internal pipe threads.

4 Claims, 6 Drawing Figures

PIPE THREAD PROTECTOR

FIELD OF THE INVENTION

The present invention relates generally to devices for protecting threads of pipe sections or the like during handling and storage and more specifically, to a device affixed to drill string members at a drilling site prior to attachment to the drill string.

BACKGROUND OF THE INVENTION

Drill string members are used to transmit rotational force to a drill bit during the drilling of an oil or gas well in the form of a multiplicity of pipe sections consecutively threadedly engaged. Prior to attachment to the drill string, the drill string pipe sections or members are handled individually such that the threads at each end are subjected to potential damage or destruction. To prevent this damage and prolong the useful life of the drill string member, devices have been constructed in the past to be placed over the threads of the pipe of the drilling string section during storage and handling. The devices are removed just prior to attachment of the pipe section to the drill string and reused on subsequent drill string members.

For instance, U.S. Pat. No. 2,141,381, issued to Engstrom, shows such a protective device constructed of a rigid outer ring having an inner surface adapted to engage the external threads of the pipe section and having a mechanical latch apparatus for constricting the outer rigid shell so as to affix the pipe thread protector to the drill string member.

U.S. Pat. No. 2,547,992, issued to Baker, shows a pipe thread protector having a rigid cylindrical outer shell which fits over the external threads of the pipe of the drill string member utilizing a complex cam actuated mechanical linkage apparatus to affix the thread protector to the pipe section. U.S. Pat. No. 2,880,761, issued to Peter, shows a bifurcated cylindrical rigid shell longitudinally hinged which includes alternating eyelets formed on opposing edges which may be engaged by a pin so as to constrict the thread protector on the drill string member.

U.S. Pat. No. 4,033,380, issued to Weber, shows a one piece thread protector constructed of a plastic material formed into a cup like structure which is forcibly mounted over the exposed threads of the drill string member and is thereby frictionally affixed.

However, these and other devices for the protection of threads on pipe sections suffer from several inefficiencies. For instance, designs using complex mechanical structures to affix the pipe thread protector are subject to great stress and must freguently be repaired or replaced. Deformation may loosen the grip of the thread protector upon the drill string member to the point of dislodgement.

Devices which rely on mere frictional contact with the thread surface offer a simplier design but are generally easier to dislodge during handling, or the coefficient of friction between the thread protector and the drill pipe threads may be reduced by the presence of contaminants such as drilling fluid, water, mud, or other fluids frequently encountered at drilling sites to the point where slippage occurs.

Therefore, it becomes advantageous to construct a pipe thread protector which obviates the inefficiencies of conventional designs by adhering to the threaded portion of a drill string member without relying on complex, easily damaged mechanical latching mechanisms, yet assuring an adequate force adhering the pipe thread protector to the drill string member.

BRIEF SUMMARY OF THE INVENTION

The present invention relates to a two piece drill string member thread protector which utilizes a partial vacuum created between the two members to affix the thread protector to the pipe. The outer member is a cup like structure coated with an abrasion resistant material with an intermediate portion of its interior forms an upwardly expanding tapered section terminating in a lip. The outer member further includes a semispherical projection formed in its base which includes a valve. The inner member likewise formed of a resilient material in a cup like structure, having a matching female semispherical cavity formed in its base and having an upper guide section so formed as to naturally resiliently expand. The inner member is slidably positioned within the cavity of the outer member and has a first position wherein the upper section occupies the outwardly expanding portion of the outer member interior cavity adjacent the lip.

When the pipe thread protector is inserted over the end of a pipe member, the inner member is driven further into the cavity of the outer member to a second position. The guide section of the inner member contracts, contacting the threads of the pipe. The inside of guide portion is suitably formed to engage the threads of the pipe section. Simultaneously, air occupying the space between the inner and outer members is forced out through the valve so as to create a partial vacuum. This partial vacuum assures the presence of an adequate force exerted by atmospheric pressure urging the inner member to maintain its second position so as to affix the pipe thread protector to the pipe even when subjected to severe forces tending to separate it therefrom.

When it is desired to remove the pipe thread protector, the valve is opened to allow air to reenter the space between the inner and outer members, thereby relieving the force holding the inner member in contact with the pipe threads. The pipe thread protector may then be easily removed.

Alternatively, the pipe thread protector may be adapted to engage and protect internal pipe threads and further may substitute mechanical locking means to maintain the inner member in contact with the pipe threads. Therefore, it is a principal feature and advantage of the invention to provide an improved pipe thread protector.

Therefore, this and numerous other features and advantages of the invention will become evident upon a detailed reading of the following description, drawings and claims and wherein:

DETAILED DESCRIPTION OF THE DRAWINGS

Figure 2:
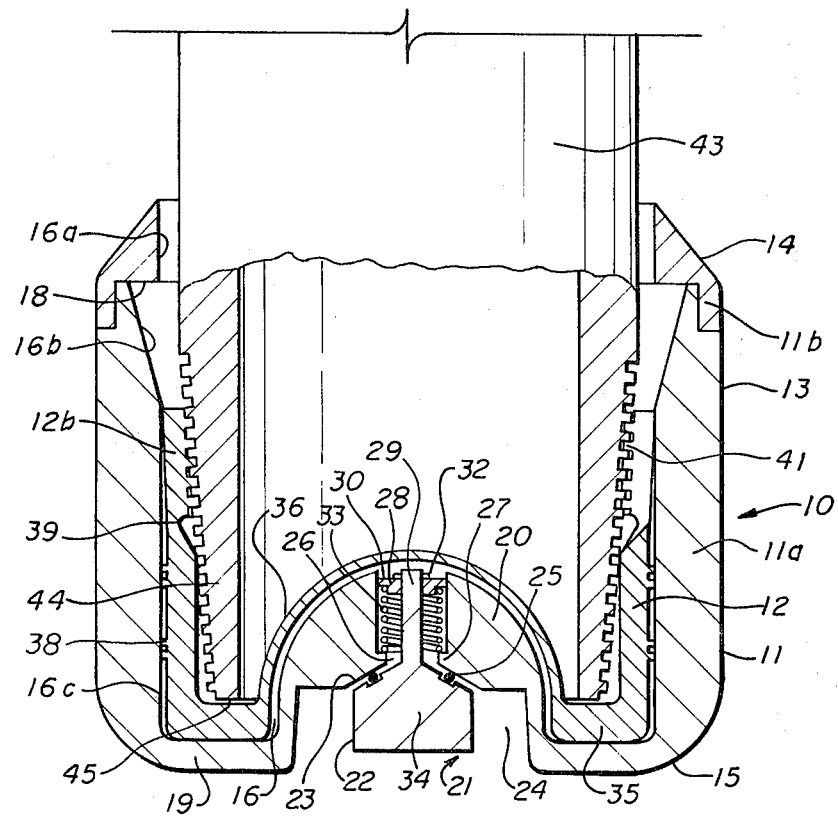
FIG. 2 is a cross sectional view of the present invention affixed to the end of a drill string member.
Figure 1:
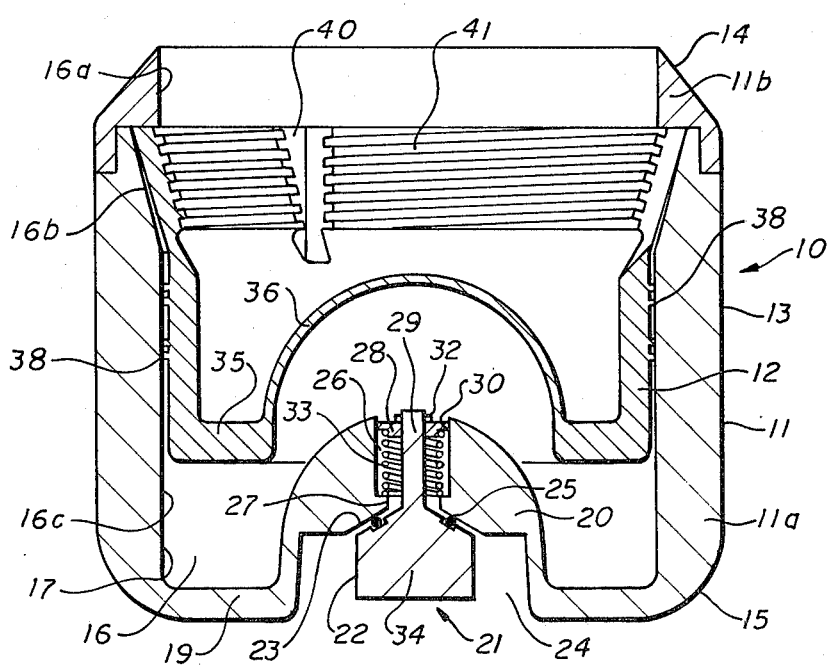
FIG. 1 is a cross sectional view of the present invention with the inner member in its first position.
Figure 3:
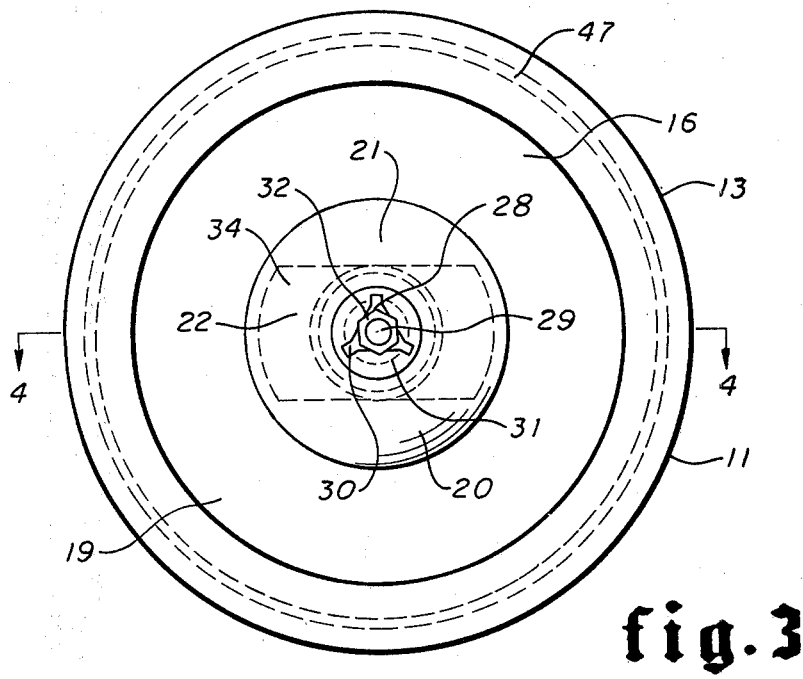
FIG. 3 is a top view of the outer member of the present invention.
Figure 4:
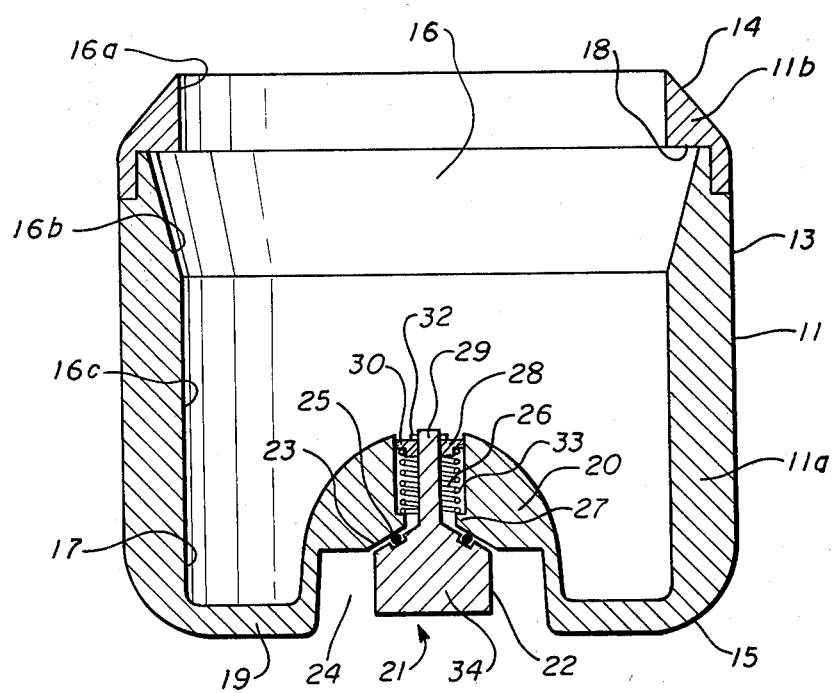
FIG. 4 is a cross sectional view of the outer member of the present invention along plane 4—4 of FIG. 3.

Referring now to FIG. 1, the numeral 10 generally illustrates the pipe thread protector of the present invention. The pipe thread protector 10 includes a outer member 11 and a inner member 12. Referring now also to FIGS. 3 and 4, the construction of the outer member 11 is shown in greater detail. Outer member 11 includes an exterior surface 13 constructed of a resilient material such as plastic or rubber which is abrasion resistent, so as to withstand rough handling and physical stress that the pipe thread protector is subjected to. A chamfered edge 14 and radius 15 aid in storage and handling of the pipe thread protector while affixed to pipe member. In the embodiment illustrated in FIGS. 1-4, the outer member 11 may be constructed of sections 11a and 11b, to facilitate assembly.

The outer member 11 includes an interior cavity 16 defining a surface 17 also constructed of an abrasion resistent material and which defines three distinct regions. An upper region 16a is formed of a suitable diameter so as to assist in the insertion of a pipe section. The interior further includes an upwardly expanding tapered section 16b which forms a lip 18. Finally, the interior 16 includes a main region 16c, cylindrical in cross section.

Formed in the base 19 of the other member 11 is a semispherical projection or dome 20, in positive relief. Mounted within the dome is a valve 21. Athough alternative valve designs may be used, in the embodiment of the invention illustrated in FIG. 1-4, the valve 21 includes a spring loaded valve element 22 urged upwardly into contact with a matching valve seat 23, formed in a recess 24 in the outer member 11. The recess 24 provides a further function of protecting the valve element 22 from abrasive or destructive contact when in use. The integrity of the seal between the valve element 22 and the valve seat 23 formed in the recess 24 is assisted by the presence of an O-ring 25 suitably arranged around the valve element as shown. The dome 20 includes a bore 26 and forms a shoulder 27 formed therewithin. A flange 28 is affixed to a stem 29 of the valve element 22. The flange 28 includes a plurality of spiders 30 which define flow areas 31 therebetween. A nut 32 or other suitable mechanical means provides a means of mounting the flange 28 on the stem 29. A resilient element or spring 33 is constrained between the flange 28 and the shoulder 26 so as to urge the valve element 22 upwardly into contact with the valve seat 23, thereby inhibiting the passage of fluid through the bore 26 into the interior 16 of the outer member 11. A handle portion 34 may be formed on the valve element to assist in the manual retraction of the valve element when such passage of fluid is desired.

Figure 5:
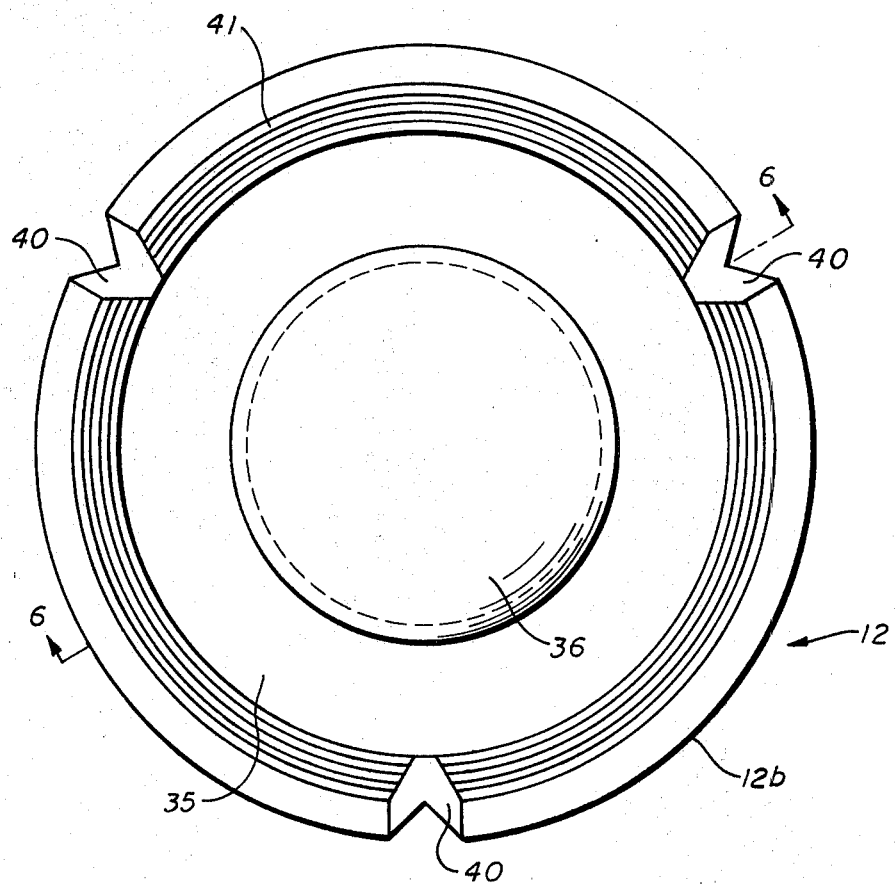
FIG. 5 is a top view of an alternative embodiment of the inner member of the present invention.
Figure 6:
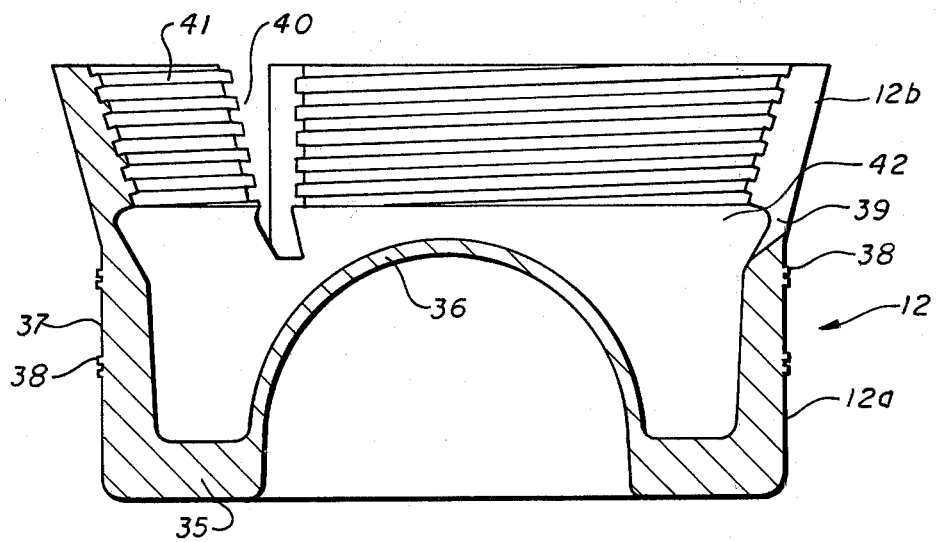
FIG. 6 is a cross sectional view of the inner member of the present invention along plane 6—6 of FIG. 5.

Turning now to FIGS. 5 and 6, there is illustrated one embodiment of the inner member 12 of the present invention being constructed of a resilient material forming a cup like structure as shown. The base 35 of the inner member 12 forms a spherical upwardly projecting cavity 36 therein. Said cavity 36 is so constructed and arranged as to mate and overlie the dome 20 formed in the outer member 11. The exterior 37 of the inner member 12 includes a first section 12a generally cylindrical in shape and includes a plurality of external ridges 38 which provide sliding sealing contact with the interior surface of the outer member 11 when inserted therein, as illustrated in FIGS. 1 and 2. The first section 12a is connected to a second section 12b by means of a hinge portion 36, said hinge portion being so constructed so as to urge the second section 12b resiliently outwardly forming a guide portion to assist in receiving the end of a pipe section. A plurality of notches 39 are formed in the upper section 12b. Further, a plurality of internal ridges 41 are formed on the interior of the guide portion 12b forming gripping means for engagement with the threads 44 of the pipe section 43.

Referring now to FIGS. 1 and 2, it will be noted that when in use, the inner member 12 is inserted into the cavity 16 of the outer member 11 and assumes one of two positions. In the first position, shown in FIG. 1, the upper section 12b occupies the tapered section 16b of the interior of the outer member adjacent the lip 18. When the thread protector is pushed onto a pipe 43, having threads 44 and end surface 45 in contact with base 35, the inner member 12 is pushed back into the second position, as shown in FIG. 2, wherein the base 35 is in full contact with the base 19 of the first member. The section 12b, having left the expanded portion 16b is constricted to the diameter of the section 16c so as to force interior ridges 41 onto sealing engagement and contact with the threads 44 of the pipe 43. The hinge portion 39 facilitates the constriction of the guide portion 12b into a generally cylindrical shape of similar diameter to the first section 12a in cooperation with the notches 40. The interior ridges 41 may be constructed in such a manner as to engage the particular diameter and thread characteristics of the pipe that the thread protector 10 is intended to be utilized with.

In the second position there is no substantial space between the base of the outer member and the base of the inner member. It is evident therefore that the air formally occupying this volume will be forced out through the valve 21, exteriorly of the pipe thread protector 10. Thus, there is a partial vacuum created between the external ridges 38 and the valve 21. Atmospheric pressure acting on the inner and outer members provides a sufficient force to retain the inner member in its second position, engaged with the pipe threads. In this fashion, the pipe thread protector of the present invention may be easily inserted over the end of a pipe section without resistance and affixed. The constrictive forces exerted against the ridges 41 assure against any undesired longitudinal movement of the protector on the pipe, short of complete destruction of the device.

When it is desired to remove the pipe thread protector it is merely required to manually retract the valve element 22 by means of the handle 34, thereby allowing atmospheric pressure to enter the space between inner and outer members, 12 and 11, equalizing the forces on either side thereof. The outer member may then be pulled away from the pipe, pulling the inner member into its first position. This expands guide portion 12b releasing the ridges 41 from contact with pipe threads 44, enabling easy removal from the pipe.

It is therefore apparent that the present invention is one well adapted to attain all of the objects and advantages hereinabove set forth, together with other advantages which will be become obvious from a description of the apparatus itself. It will be understood that certain combinations and subcombinations are of utility and may be employed without reference to other features and subcombinations. This is contemplated by and is within the scope of the present invention. As many possible embodiments may be made of this invention without departing from the spirit or scope thereof. It is to be understood that all matters hereinabove set forth are shown in the accompanying drawings are to interpreted as illustrative in not a limiting sense.

In an alternative embodiment of the invention, the first member 12 may further include a rigid cylindrical structural member 47 illustrated in FIG. 3, which may be constructed of steel or the like, being in concentric arrangement within the member. The structural member further increases the strength and rigidity of the pipe thread protector.

In a further alternative embodiment of the invention, it is evident that a resilient outer member may be contructed having external gripping means which may be inserted into a pipe section to protect internal threads. A rigid inner member may be slidably constrained within a cavity in the outer member. When in one position, the inner member may expand the outer member portion bearing the gripping means to place it in sealing contact with internal pipe threads. A valve may be provided to evacuate the air between the inner and outer member to maintain the gripping means in engagement with the threads as hereinabove set forth. The valve may be opened to shift the inner member to its original position. The inner member contracts, the gripping means releases the threads and the pipe thread protector may be removed inside the pipe.

In yet a further alternative embodiment of the invention, the inner member may be maintained in its second position by mechanical locking means, in place of the vacuum controlled by the valve 21. The operation of the gripping means is unaltered, relative longitudinal movement of the inner and outer member being restrained by the mechanical locking means. The mechanical locking means may comprise a radially mounted retractable spring loaded pin mounted in the outer member, which engages an indentation in the inner member when in the second position. The pin may be externally retracted to allow the inner member to shift to its first position when desired. Numerous alternative mechanical structures may be devised and are within the spirit and scope of the invention hereinabove set forth.

Therefore, the invention having been described and set forth hereinabove, that which is desired to be claimed and secured by United States Letters Patent is:

1. A pipe thread protector for protecting the threads of a pipe section, comprising:
   (a) a first member having a first cavity;
   (b) a second member slidably constrained within the first cavity between first and second positions, said second member including sealing means for providing sealing contact with said first cavity, said second member having a second cavity for reception of the pipe section therewithin when in said first position, said second member being shifted to said second position when the pipe section is fully inserted within the second cavity;
   (c) gripping means formed on said second cavity for engaging the pipe threads when said second member is in said second position, said gripping means releasing said pipe threads when in said first position;
   (d) locking means for maintaining said second member in said second position whereby said gripping means are retained in engagement with the pipe threads, said locking means being externally releasable for removing the pipe thread protector from the pipe section;
   (e) said locking means comprises vacuum means for evacuation of air between said first and second members when said second member is shifted to said second position, whereby said second member is maintained in said second position, said vacuum means further enabling the readmission of air between said first and second members so as to enable said first member to shift to said first position for releasing said pipe thread protector from the pipe section.

2. The pipe thread protector of claim 1, wherein said second member includes an outwardly expanding tapered guide portion defining an outwardly expanding tapered section of said second cavity, said gripping means mounted on said outwardly expanding section of said second cavity, said guide portion being expanded when said second member is in said first position, and said guide portion being constricted when said second member is shifted to said second position so as to bring said gripping means into engagement with the threads of a pipe section.

3. The pipe thread protector of claim 2, wherein said gripping means comprises a plurality of concentric ridges formed on the interior of the guide portion of the second member so constructed and arranged as to sealingly engage the threads of the pipe section.

4. A method for protecting the threads of a pipe section, comprising:
   (a) forming an outer member having a first cavity;
   (b) forming a valve in said outer member;
   (c) forming a second member having a second cavity;
   (d) forming gripping means on said second cavity;
   (e) placing said second member in a first position within said first cavity;
   (f) inserting the pipe section into said second cavity;
   (g) forcing said second member into a second position;
   (h) constricting said gripping means over the threads of the pipe section;
   (i) evacuating air from between said first and second members through said valve;
   (j) opening said valve so as to readmit air between said first and second members when removal of the first and second members is desired;
   (k) sliding said second member into said first position;
   (l) releasing said gripping means from the threads of the pipe section;
   (m) removing the pipe section from said second cavity.

* * * * *